United States Patent
Rozman

[19]

[11] Patent Number: 6,084,786
[45] Date of Patent: Jul. 4, 2000

[54] CONVERTER SYSTEM WITH POWER FACTOR AND DC RIPPLE CONTROL

[75] Inventor: Gregory I. Rozman, Rockford, Ill.

[73] Assignee: Hamilton Sundstrand Corporation, Rockford, Ill.

[21] Appl. No.: 09/239,600

[22] Filed: Jan. 29, 1999

[51] Int. Cl.[7] .................................................. H02M 1/12
[52] U.S. Cl. ............................................................ 363/48
[58] Field of Search .................................. 363/48, 47, 46, 363/53, 89

[56] References Cited

U.S. PATENT DOCUMENTS

| | | | |
|---|---|---|---|
| 3,825,814 | 7/1974 | Pelly | 363/39 |
| 4,193,111 | 3/1980 | Wester | 363/84 |
| 4,412,277 | 10/1983 | Mitchell | 363/81 |
| 4,620,272 | 10/1986 | Fulton et al. | 363/53 |
| 4,980,812 | 12/1990 | Johnson, Jr. et al. | 363/44 |
| 5,309,078 | 5/1994 | Cameron | 318/811 |
| 5,353,212 | 10/1994 | Loftus, Jr. | 363/17 |

FOREIGN PATENT DOCUMENTS

| | | |
|---|---|---|
| 0590648 | 4/1994 | European Pat. Off. . |
| 61-177170 | 8/1986 | Japan . |
| 2-36765 | 4/1990 | Japan . |
| 4-26373 | 1/1992 | Japan . |
| 5-252749 | 1/1994 | Japan . |
| 5-260752 | 1/1994 | Japan . |
| 5-344736 | 3/1994 | Japan . |
| 6-113552 | 7/1994 | Japan . |
| WO 94/27358 | 11/1994 | WIPO . |

OTHER PUBLICATIONS

"The Ultimate In Power–Matched Variable–Speed Motors," Reliance Electric Industrial Company, (1996), No month.

Nelik, Lev et al., "Are "Smart" Pumps in Your Future?" Motors, Pumps and Systems Magazine, Circle Reader Service No. 170, (Mar. 1997).

"New Motor–Mounted A–S Drive Controller," Power Transmission Design, (Jul. 1995).

Suranyi, Gabriel G., Bus Voltage Level Comparisons for Distributed Power Architectures, (Jun. 1995).

Primary Examiner—Shawn Riley
Attorney, Agent, or Firm—Marshall O'Toole Gerstein Murray & Borun

[57] ABSTRACT

An AC to DC converter is controlled so that its output DC is substantially ripple free and so that its input AC has substantially unity power factor. The AC to DC converter is controlled in response to the voltage and current of the input AC so that the power factor of the input AC is substantially unity. The AC to DC converter is also controlled in response to the output DC so that ripple in the output DC is suppressed. An error between the output DC and a DC reference may be integrated in a low gain path during substantially steady state conditions and in a high gain path during transient conditions so as to suppress ripple in the output DC.

49 Claims, 3 Drawing Sheets

FIG. 5

CONVERTER SYSTEM WITH POWER FACTOR AND DC RIPPLE CONTROL

TECHNICAL FIELD

The present invention relates generally to a converter system and, more particularly, to a converter system which converts AC to DC and which incorporates power factor and DC ripple control.

BACKGROUND OF THE INVENTION

Converters, such as those which convert input AC power into output DC power for supply to one or more loads, have many applications. For example, converters are used to convert three or more phase input AC power into output DC power for onboard DC loads of an aircraft. While the aircraft is on the ground, the input AC power is typically supplied by a ground power cart; on the other hand, while the aircraft is in the air, the input AC power is supplied by generators driven by the engines of the aircraft. Thus, the converter converts the input AC power into DC power for onboard DC loads while the aircraft is on the ground or in the air.

A typical AC to DC converter includes multiple rectifiers connected together in a bridge configuration. The rectifiers are controlled so as to convert the input AC power into output DC power. A rectifier bridge, however, typically presents a non-unity power factor to the input AC source. Hence, the input AC source must have a greater capacity than if the rectifier bridge were to present a unity power factor load to the input AC source. Moreover, the output DC of a rectifier bridge typically exhibits a substantial amount of harmonic ripple.

The present invention is directed to an arrangement which controls the rectifiers of a rectifier bridge so that the rectifier bridge presents a unity power factor load to the input AC source and so that the harmonic ripple in the output DC of the rectifier bridge is suppressed, minimized, reduced, and/or eliminated.

SUMMARY OF THE INVENTION

In accordance with one aspect of the present invention, a system comprises an AC to DC converter and a controller. The AC to DC converter receives an input AC and converts the input AC to an output DC. The input AC has a voltage, a current, and a power factor based upon the voltage and current. The controller is arranged to receive the output DC and the voltage and current of the input AC, the controller is arranged to control the AC to DC converter so that the power factor is controlled, and the controller has an integrator arranged to control ripple in the output DC.

In accordance with another aspect of the present invention, a system comprises AC to DC converting means and controlling means. The AC to DC converting means converts an input AC to an output DC, wherein the input AC has a voltage, a current, and a power factor between the voltage and current. The controlling means controls the AC to DC converting means in response to the voltage and current of the input AC and in response to the output DC so that the power factor is controlled and so that ripple in the output DC is controlled.

In accordance with still another aspect of the present invention, a method comprises the following steps: a) converting an input AC to an output DC, wherein the input AC has a voltage, a current, and a power factor between the voltage and current; b) responding to the voltage and current of the input AC so that the power factor is a substantially unity power factor; and c) responding to the output DC so that ripple in the output DC is suppressed.

BRIEF DESCRIPTION OF THE DRAWINGS

These and other features and advantages of the present invention will become more apparent from a detailed consideration of the invention when taken in conjunction with the drawings in which.

DESCRIPTION OF THE PREFERRED EMBODIMENT

Figure 1:
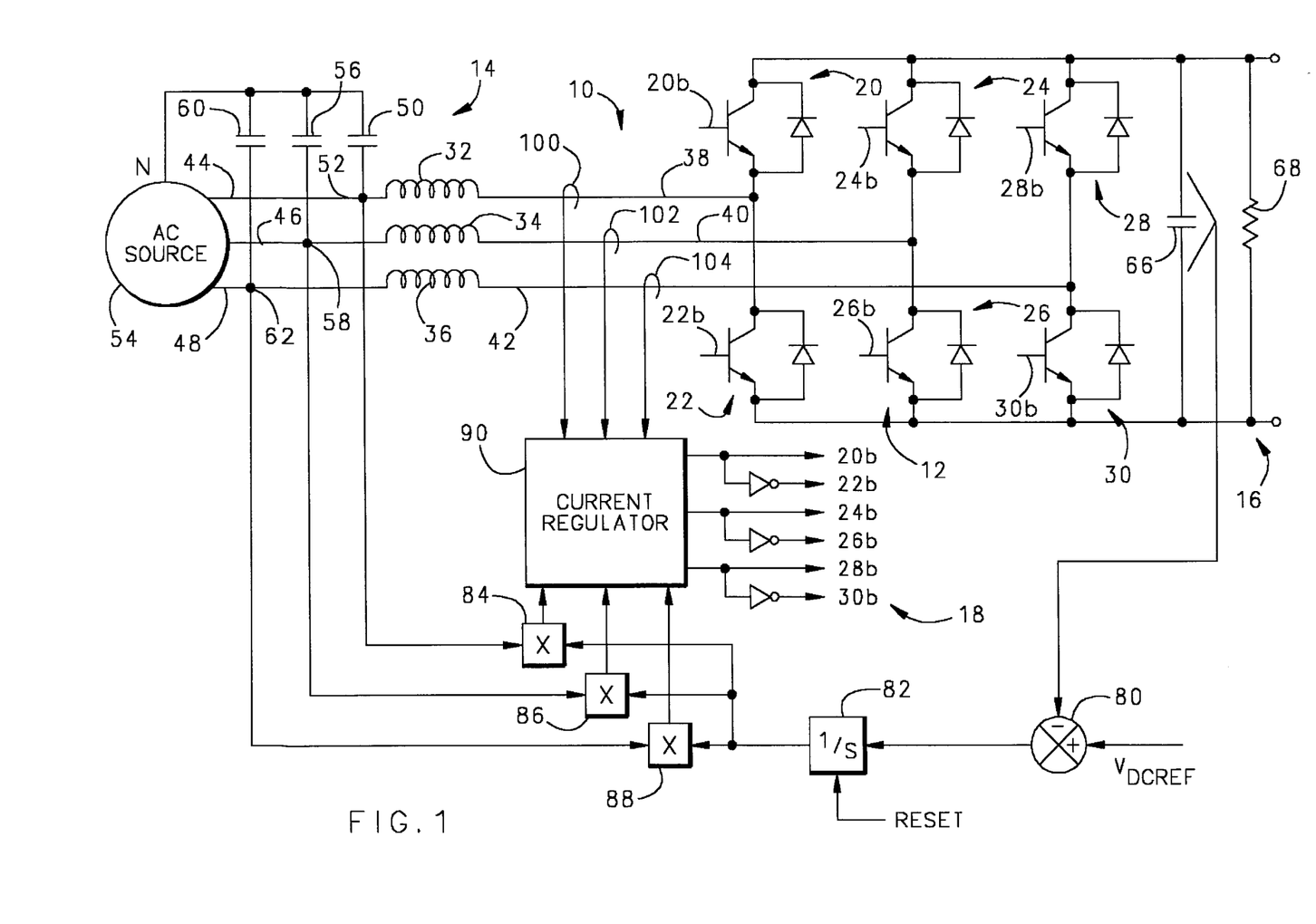
FIG. 1 illustrates a converter system incorporating a current regulator and an integrator for providing power factor and DC ripple control according to an analog embodiment of the present invention.

As shown in FIG. 1, a converter system 10, which is implemented as an analog converter system, includes an AC to DC converter 12 that receives input AC power from an input AC source 14. The AC to DC converter 12 converts the input AC power to output DC power, and supplies the output DC power over a DC link 16. A controller 18 controls the AC to DC converter 12.

The AC to DC converter 12 includes rectifiers 20, 22, 24, 26, 28, and 30, and inductors 32, 34, and 36. Each of the rectifiers 20, 22, 24, 26, 28, and 30 includes, for example, a corresponding power transistor having a base, a collector, and an emitter. Each of the rectifiers 20, 22, 24, 26, 28, and 30 also includes a fly back diode connected from the emitter to the collector of its corresponding power transistor. A converter line 38 connects the inductor 32 to a junction formed by the emitter of the power transistor of the rectifier 20 and the collector of the power transistor of the rectifier 22. A converter line 40 connects the inductor 34 to a junction formed by the emitter of the power transistor of the rectifier 24 and the collector of the power transistor of the rectifier 26. A converter line 42 connects the inductor 36 to a junction formed by the emitter of the power transistor of the rectifier 28 and the collector of the power transistor of the rectifier 30.

The input AC source 14 provides, for example, three-phase power to the AC to DC converter 12 over converter input lines 44, 46, and 48. A capacitor 50 is connected from a junction 52, which is between the inductor 32 and the converter input line 44, to a neutral N of an AC input 54. A capacitor 56 is connected from a junction 58, which is between the inductor 34 and the converter input line 46, to the neutral N of the AC input 54. A capacitor 60 is connected from a junction 62, which is between the inductor 36 and the converter input line 48, to the neutral N of the AC input 54.

The collectors of the power transistors of the rectifiers 20, 24, and 28 are connected to one polarity of the DC link 16, and the emitters of the power transistors of the rectifiers 22, 26, and 30 are connected to the other polarity of the DC link 16. The DC link 16 includes a DC link capacitor 66 and a DC load 68 connected in parallel between the two polarities of the output DC.

The controller 18 includes a comparator block 80 which compares a DC reference $V_{DCREF}$ to a DC feedback $V_{DCFDBK}$. The DC feedback $V_{DCFDBK}$ is derived by sensing the DC voltage across the DC link capacitor 66. The comparator block 80, for example, may be a summer that subtracts the DC feedback $V_{DCFDBK}$ from the DC reference $V_{DCREF}$ to generate an error. Alternatively, the comparator block 80 may be any other device which is suitable for generating an error between the DC feedback $V_{DCFDBK}$ and the DC reference $V_{DCREF}$.

The error generated by the comparator block 80 is integrated by an integration block 82, and the integrated error is supplied by the integration block 82 to multiplier blocks 84, 86, and 88. The multiplier block 84 multiplies the integrated error from the integration block 82 by an input AC phase voltage at the junction 52.

The multiplier block 84 provides the result of its multiplication to a current regulator 90. Similarly, the multiplier block 86 multiplies the integrated error from the integration block 82 by an input AC phase voltage at the junction 58. The multiplier block 86 provides the result of its multiplication to the current regulator 90. Likewise, the multiplier block 88 multiplies the integrated error from the integration block 82 by an input AC phase voltage at the junction 62. The multiplier block 88 provides the result of its multiplication to the current regulator 90. Accordingly, the input AC phase voltage for each phase of the AC input 54 is multiplied by the integrated error between the DC reference $V_{DCREF}$ and the DC feedback $V_{DCFDBK}$, and the multiplication results are supplied to the current regulator 90.

In addition to receiving the multiplication results from the multiplier blocks 84, 86, and 88, the current regulator 90 receives representations of the input AC phase currents carried by the converter lines 38, 40, and 42. Accordingly, a current transformer 100 senses the input AC phase current in the converter line 38, a current transformer 102 senses the input AC phase current in the converter line 40, and a current transformer 104 senses the input AC phase current in the converter line 42. Representations of the input AC phase currents sensed by the current transformers 100, 102, and 104 are provided by the current transformers 100, 102, and 104 to the current regulator 90 as feedback currents, whereas the multiplication results from the multiplier blocks 84, 86, and 88 are provided to the current regulator 90 as reference currents.

Figure 2:
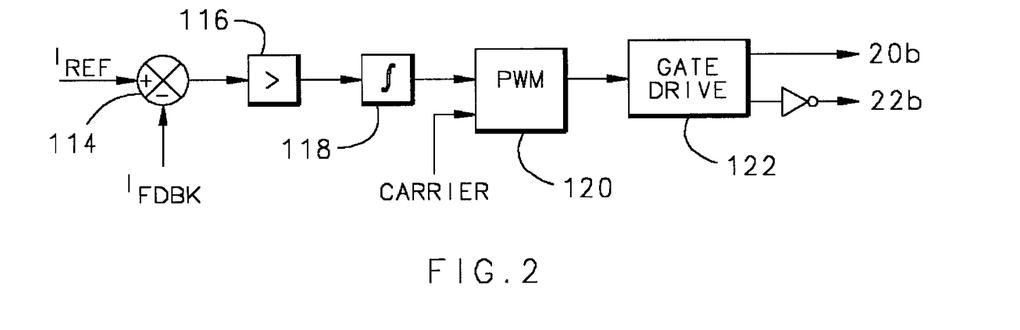
FIG. 2 illustrates in more detail the current regulator of the converter system illustrated in FIG. 1.

FIG. 2 illustrates the portion of the current regulator 90 which controls the power transistors of the rectifiers 20 and 22 of the AC to DC converter 12. The current transformer 100 provides a feedback current $I_{FDBKa}$, which corresponds to the input AC phase current in the converter line 38, to one input of a comparator block 114 of the current regulator 90. The multiplier block 84 provides the reference current $I_{REFa}$, which is based upon the multiplication of the integrated error supplied by the integration block 82 and the input AC phase voltage at the junction 52, to another input of the comparator block 114 of the current regulator 90. The comparator block 114 compares the reference current $I_{REFa}$ to the feedback current $I_{FDBKa}$ in order to generate an error output. The comparator block 114, for example, may be a summer that subtracts the feedback current $I_{FDBKa}$ from the reference current $I_{REFa}$ in order to produce this error output.

Gain is applied to the error output from the comparator block 114 at a gain block 116. Alternatively, gain and integration may be applied to the error output from the comparator block 114. The error output from the gain block 116 is limited by a limit block 118 which limits the error output from the gain block 116 between maximum and minimum values. The limited error output is then supplied as one input to a pulse width modulation block 120 which modulates a carrier in response to the limited error output from the limit block 118. The carrier, for example, may be a triangular wave carrier. The modulated carrier is provided to a gate drive block 122 in order to drive the bases of the power transistors of the rectifiers 20 and 22.

It should be understood that another portion of the current regulator 90, similar to the portion illustrated in FIG. 2, controls the power transistors of the rectifiers 24 and 26 of the AC to DC converter 12 in response to a feedback current $I_{FDBKb}$, which corresponds to the input AC phase current in the converter line 40 as sensed by the current transformer 102, and the reference current $I_{REFb}$, which is based upon the multiplication of the integrated error supplied by the integration block 82 and the input AC phase voltage at the junction 58. Like-wise, still another portion of the current regulator 90, similar to the portion illustrated in FIG. 2, controls the power transistors of the rectifiers 28 and 30 of the AC to DC converter 12 in response to a feedback current $I_{FDBKc}$, which corresponds to the input AC phase current in the converter line 42 as sensed by the current transformer 104, and the reference current $I_{REFc}$, which is based upon the multiplication of the integrated error supplied by the integration block 82 and the input AC phase voltage at the junction 62. Additional portions of the current regulator may be necessary if there are more input phases.

Because the current regulator 90 is driven by both the input AC phase currents as sensed by the current transformers 100, 102, and 104, and the input AC phase voltages as sensed at the junctions 52, 58, and 62, the input AC phase currents in the converter lines 38, 40, and 42 are made to track the input AC phase voltages so that the power factor of the input AC source is substantially unity.

Moreover, the integration block 82 provides an input to the current regulator 90 through the multiplier blocks 84, 86, and 88. This input is based upon the DC voltage across the DC link capacitor 66. Accordingly, the rectifiers 20, 22, 24, 26, 28, and 30 of the AC to DC converter 12 are controlled so as to reduce ripple on the DC link 16. In effect, the integration block 82 makes the AC to DC converter 12 less sensitive to imbalances on the source side of the AC to DC converter 12, thereby reducing the ripple content in the output DC power on the DC link 16.

Furthermore, the level of the DC voltage on the DC link 16 is determined by the DC reference $V_{DCREF}$ provided to the comparator block 80. That is, the DC reference $V_{DCREF}$ as provided to the comparator block 80 ensures that the current controller 90 controls the rectifiers 20, 22, 24, 26, 28, and 30 so that the DC voltage on the DC link 16 is at the DC reference $V_{DCREF}$.

The integration block 82 may be reset upon power up, for example, in order to guard against a condition where the AC to DC converter 12 is called upon to generate full output DC power at a level specified by $V_{DCREF}$ even though the AC input 54 is just winding up. Thus, at power up, the output of the integration block 82 may be reset to some minimum level, such as zero, in order to soft start the AC to DC converter 12.

Figure 3:
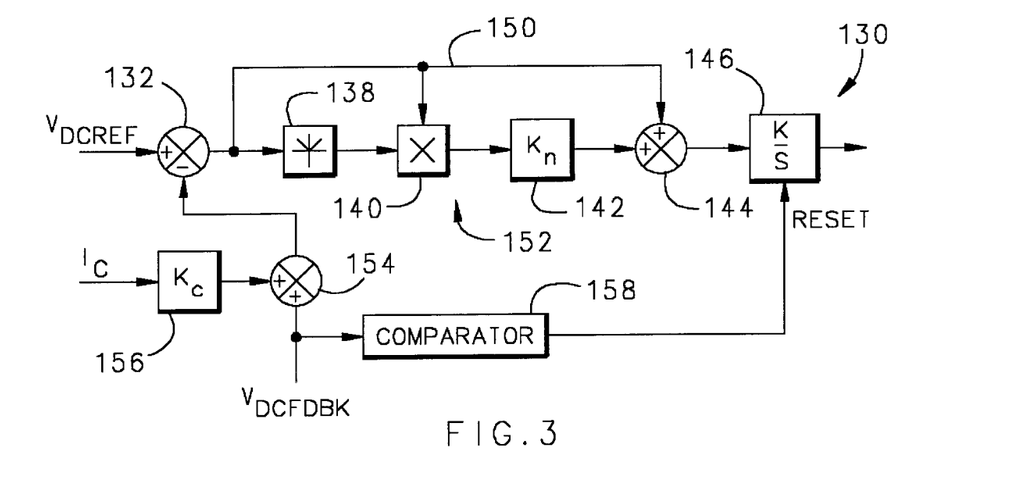
FIG. 3 illustrates an alternative embodiment of the integrator illustrated in FIG. 1.

The integration block 82 as shown in FIG. 1 works well in substantially steady state conditions, but may be slow to respond to transient conditions. Accordingly, an integration block 130 may be substituted for the comparator block 80 and the integration block 82 in the control arrangement shown in FIG. 1. The integration block 130 includes a comparator block 132 which compares the DC reference $V_{DCREF}$ to a modified DC feedback $V^*_{DCFDBK}$ in order to produce an error output. The comparator block 132, for example, may be a summer that subtracts the modified DC feedback $V^*_{DCFDBK}$, which is derived from the DC link capacitor 66, from the DC reference $V_{DCREF}$ to produce the error output.

This error output is provided to an absolute value block 138. A multiplier block 140 multiplies the absolute value of the error output by the error output itself. In essence, the absolute value block 138 and the multiplier block 140 square the error output, but preserve the sign of the error output from the comparator block 132. The output of the multiplier block 140 is supplied to a gain block 142 and the output of the gain block 142 is supplied to one input of a summing block 144, another input of which receives the error output from the comparator block 132. The summing block 144 sums the error output of the comparator block 132 with the sign preserved square of the error output. The output of the summing block 144 is then integrated by an integration function 146.

The integration block 130 has an upper path 150 and a lower path 152. The upper path 150 is a low gain path that works well in steady state conditions. The lower path 152 (including the absolute value block 138, the multiplier block 140, and the gain block 142) is a high gain path that works well in transient conditions because it boosts the error output from the comparator block 132 so that the boosted error output results in a faster response from the integration function 146.

As shown in FIG. 3, the DC feedback $V_{DCFDBK}$ from the DC link capacitor 66 is not applied directly to the comparator block 132. Instead, the DC feedback $V_{DCFDBK}$ from the DC link capacitor 66 is provided to one input of a summing block 154, the other input of which receives DC link current $I_c$ through a gain block 156. The DC link current $I_c$ is the current that flows through the DC link capacitor 66. The summing block 154 adds the output of the gain block 156 and the DC feedback $V_{DCFDBK}$ in order to produce the modified the DC feedback $V^*_{DCFDBK}$. Accordingly, by using the DC link current $I_c$, which is representative of the derivative of the DC link voltage across the DC link capacitor 66, response to transient conditions is faster. That is, when a transient condition occurs which causes the DC link voltage to change, the DC link current $I_c$, which is a reflection of the derivative of the DC link voltage, causes the integration block 130 to react more quickly than otherwise would be the case.

The DC feedback $V_{DCFDBK}$ is also supplied to a comparator block 158 which compares the DC feedback $V_{DCFDBK}$ to a predetermined threshold, such that the integration function 146 is reset until the DC feedback $V_{DCFDBK}$ attains the pre-determined threshold, after which the integration function 146 is not reset. For example, if $V_{DCREF}$ is 400 volts so that the DC link voltage is to be controlled at 400 volts, the predetermined threshold imposed by the comparator block 158 may be 270 volts. Accordingly, the integration function 146 does not perform its integration function until the DC feedback VDCFDBK reaches 270 volts.

Figure 4:
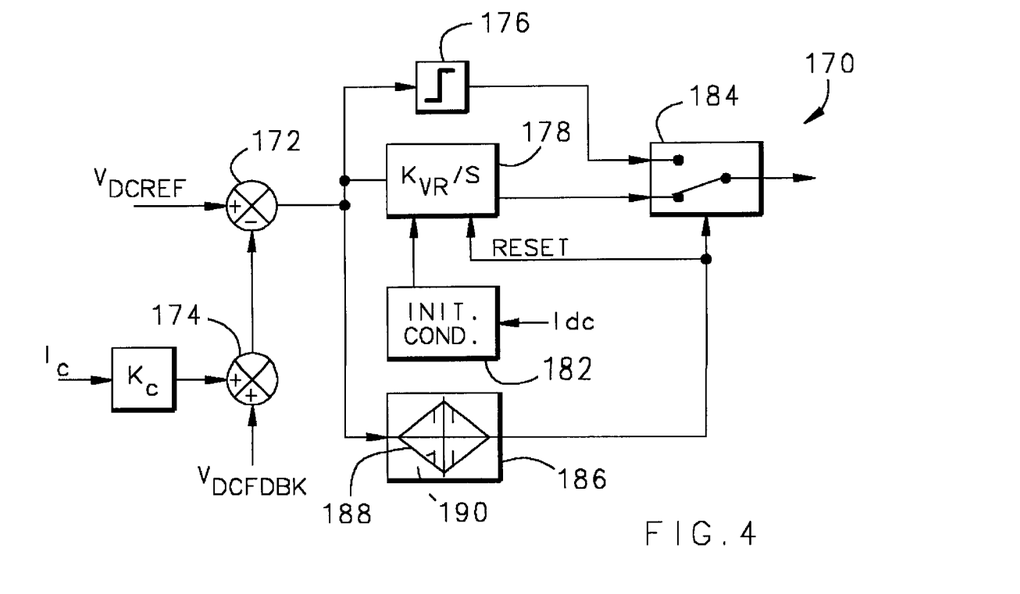
FIG. 4 illustrates a further alternative embodiment for the integrator illustrated in FIG. 1; and, FIG. 5 illustrates a converter system incorporating power factor and DC ripple control according to a digital embodiment of the present invention.

FIG. 4 shows an integration block 170 which alternatively may be used in place of the integration block 82 in FIG. 1. The integration block 170 includes a comparator block 172 which compares the DC reference $V_{DCREF}$ to the modified DC feedback $V^*_{DCFDBK}$ in order to produce an error output. The comparator block 172, for example, may be a summer that subtracts the modified DC feedback $V_{DCFDBK}$ from the DC reference $V_{DCREF}$ to produce the error output.

The error output is provided to a high gain block 176 that has a two-level output. A first output of the high gain block 176 has one extreme value if the magnitude of the error output from the comparator block 172 is above a predetermined threshold, and a second output of the high gain block 176 has another extreme value if the magnitude of the error output from the comparator block 172 is below the predetermined threshold. Thus, the high gain block 176 in effect imposes a bang-bang operation on the error output of the comparator block 172.

The error output produced by the comparator block 172 is also provided to a low gain integration function 178. The initial conditions for the low gain integration function 178 are provided from a table stored in a table block 182. The table block 182 stores sets of initial conditions, and provides a set of initial conditions to the low gain integration function 178 depending upon the current IDC flowing through the DC load. These initial conditions may be selected to permit the AC to DC converter 12 to soft start, particularly at start up of the input AC source 14.

A selector block 184 selects whether the output of the high gain block 176 or the output of the low gain integration function 178 is provided to the multiplier blocks 84, 86, and 88. The selector block 184 is controlled by a comparator block 186 which compares the error output from the comparator block 172 to a set of conditions defining the diamond 188 and the band 190. The horizontal axis of the diamond 188 and the band 190 is the error output (e) from the comparator block 172, and the vertical axis of the diamond 188 and the band 190 is the derivative of the error output (de/dt) from the comparator block 172 which is proportional to the DC link current $I_c$. If the error output and its derivative are within the diamond 188, the selector block 184 is controlled to select the output of the low gain integration function 178. If the error output and its derivative are outside the diamond 188, which occurs during transient conditions, the band 190 becomes active, the selector block 184 is controlled to select the output of the high gain block 176, and the low gain integration function 178 is reset to conditions selected by the table block 182. When the error output and its derivative return to within the band 190, the diamond 188 becomes active, and the selector block 184 is controlled to select the output of the low gain integration function 178. Accordingly, the integration block 170 is arranged to respond faster to transient conditions.

Figure 5:
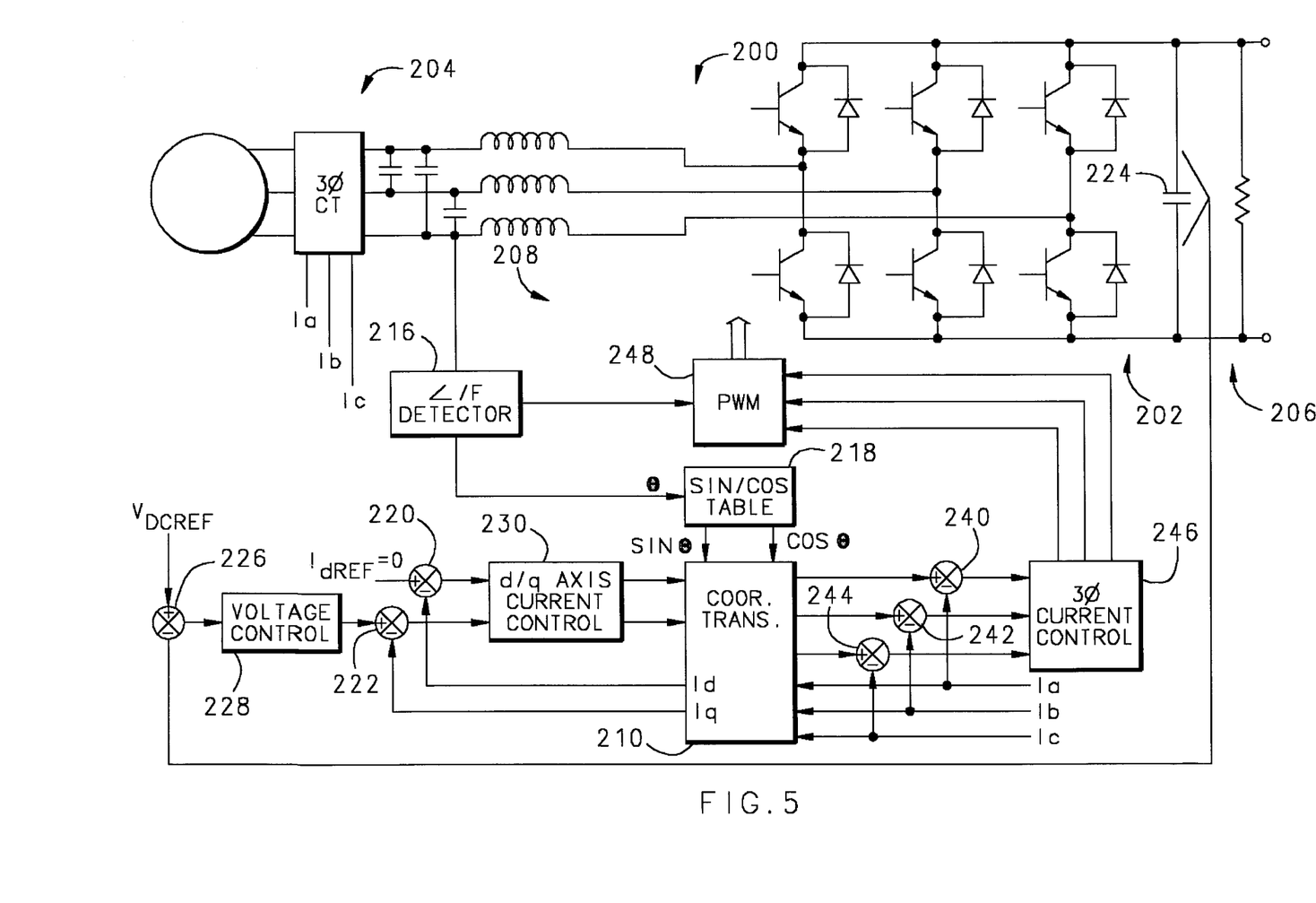

A converter system 200 shown in FIG. 5 may be implemented as a digital converter system. The converter system 200 includes an AC to DC converter 202 which converts input AC from an input AC source 204 to DC for supply over a DC link 206. The AC to DC converter 202 is controlled by a controller 208.

The controller 208 includes a coordinate transformation block 210. The coordinate transformation block 210 transforms the three-phase feedback currents $I_a$, $I_b$, and $I_c$ provided by a three-phase current transformer CT into a direct component $I_d$ and a quadrature component $I_q$. The three-phase feedback currents $I_a$, $I_b$, and $I_c$ represent the input AC to the AC to DC converter 202.

An angle θ, i.e., the angle between the voltage and current of one of the phases of the input AC source 204, is derived by an angle/frequency detector block 216 which is connected to the input AC source 204. The angle/frequency detector block 216 provides the angle θ to a sine/cosine table block 218. If the angle θ is not detectable from a selected one of the phases of the input AC source 204, the angle/frequency detector block 216 may be arranged to detect the angle θ based upon another of the phases of the input AC source 204. The sine/cosine table block 218 provides the sin(θ) and the cos(θ) to the coordinate transformation block 210. Based upon sin(θ) and cos(θ), the coordinate transformation block 210 transforms the three-phase feedback currents $I_a$, $I_b$, and $I_c$ into their direct and quadrature components $I_d$ and $I_q$.

In making the coordinate transformation, the coordinate transformation block 210 first determines the component $I_d^*$ and the component $I_q^*$ based upon the following equations:

$$I_d^* = -\frac{1}{\sqrt{3}} I_a - \frac{2}{\sqrt{3}} I_b \quad (1)$$

$$I_q^* = I_a \quad (2)$$

The coordinate transformation block 210 then transforms the component $I_d^*$ and the component $I_q^*$ according to the following matrix equation:

$$\begin{bmatrix} I_q \\ I_d \end{bmatrix} = \begin{bmatrix} \cos\theta & -\sin\theta \\ \sin\theta & \cos\theta \end{bmatrix} \begin{bmatrix} I_q^* \\ I_d^* \end{bmatrix} \quad (3)$$

The direct component $I_d$ is supplied to a comparator block 220 which compares the direct component $I_d$ to a direct component reference $I_{dREF}$. The direct component reference $I_{dREF}$ may be zero in order to suppress the direct component $I_d$ related to the operation of the AC to DC converter 202. The quadrature component $I_q$ is supplied to a comparator block 222 which compares the quadrature component $I_q$ to a quantity based upon the DC link voltage across a DC link capacitor 224 and the DC reference $V_{DCREF}$.

More specifically, a comparator block 226 compares the DC reference $V_{DCREF}$ to a DC feedback $V_{DCFDBK}$, where the DC feedback $V_{DCFDBK}$ is the DC link voltage across the DC link capacitor 224, in order to generate an error output.

This error output is supplied through a voltage control block 228 to a positive input of the comparator block 222. The negative input of the comparator block 222 receives the quadrature component $I_q$. The voltage control block 228 may perform the integration function of the integration block 82 of FIG. 1, the integration block 130 of FIG. 3, the integration block 170 of FIG. 4, or the like.

The outputs of the comparator blocks 220 and 222 are provided to a d/q axis current control block 230. The d/q axis current control block 230 may apply a proportional control function, or proportional and integral control functions, individually to the error outputs generated by the comparator blocks 220 and 222. These error outputs, as processed by the d/q axis current control block 230, are then passed to the coordinate transformation block 210.

Based upon sin(θ) and cos(θ), the coordinate transformation block 210 translates the error outputs as processed by the d/q axis current control block 230 into three-phase reference currents $I_a^*$, $I_b^*$, and IC. Specifically, the coordinate transformation block 210 first transforms the error functions $e_d$ and $e_q$, which are the error outputs from the comparator blocks 220 and 222, respectively, as individually processed by the d/q axis current control block 230, according to the following matrix equation:

$$\begin{bmatrix} e_q^* \\ e_d^* \end{bmatrix} = \begin{bmatrix} \cos\theta & \sin\theta \\ -\sin\theta & \cos\theta \end{bmatrix} \begin{bmatrix} e_q \\ e_d \end{bmatrix} \quad (4)$$

The coordinate transformation block 210 then determines the three-phase reference currents $I_a^*$, $I_b^*$, and $I_c^*$, from the following equations:

$$I_a^* = e_q^* \quad (5)$$

$$I_b^* = -\frac{1}{2} e_q - \frac{\sqrt{3}}{2} e_d \quad (6)$$

$$I_c^* = -I_a^* - I_b^* \quad (7)$$

The three-phase reference currents $I_a^*$, $I_b^*$, and $I_c^*$ are supplied to positive inputs of corresponding comparator blocks 240, 242, and 244. The three-phase feedback currents $I_a$, $I_b$, and $I_c$ are provided to minus inputs of the corresponding comparator blocks 240, 242, and 244. The comparator blocks 240, 242, and 244 generate control errors between the three-phase reference currents $I_a^*$, $I_b^*$, and $I_c^*$ and the corresponding three-phase feedback currents $I_a$, $I_b$, and $I_c$.

These control errors are provided to a three-phase current controller block 246. The three-phase current controller block 246 may be a gain block which individually applies gain to the control errors provided by the comparator blocks 240, 242, and 244. The outputs of the three-phase current controller block 246 are then provided to a pulse width modulator block 248 which also receives a frequency input f from the angle/frequency detector block 216. The pulse width modulator block 248 may be similar to the pulse width modulator block 120 shown in FIG. 2, the primary difference being that the carrier, which is modulated by the outputs from the three-phase current control block 246, is synchronized by the frequency input f supplied by the angle/frequency detector 216. The outputs of the pulse width modulator block 248 are provided to the rectifiers of the AC to DC converter 202 in a manner similar to that shown in FIG. 1.

By setting the direct component reference $I_{dREF}$ supplied to the comparator block 220 to zero, the direct component $I_d$, on which the three-phase reference currents $I_a^*$, $I_b^*$, and $I_c^*$ are based, is suppressed, allowing the quadrature component $I_q$ to control the pulse width modulator block 248. In this manner, the pulse width modulator block 248 controls the AC to DC converter 202 only in response to the quadrature component of the input currents from the input AC source 204, which are aligned angularly with the input voltages from the input AC source 204. Accordingly, the power factor between the voltages and corresponding currents from the input AC source 204 is unity.

Moreover, the voltage control block 228 responds to the DC reference $V_{DCREF}$ and the DC link voltage across the DC link capacitor 224 so that the AC to DC converter 202 is controlled in a manner to suppress ripple on the DC link 206.

Furthermore, the level of the DC voltage on the DC link 206 is determined by the DC reference $V_{DCREF}$ provided to the comparator block 226. That is, the DC reference $V_{DCREF}$ as provided to the comparator block 226 ensures that the controller 208 controls the AC to DC converter 202 so that DC voltage on the DC link 206 is at the DC reference $V_{DCREF}$.

Certain modifications of the present invention have been discussed above. Other modifications will occur to those practicing in the art of the present invention. For example, the comparator block 80, as described above, may be any device other than a summer which is suitable for generating an error between the DC feedback $V_{DCFDBK}$ and the DC reference $V_{DCREF}$. Similarly, the comparator blocks 114, 132, 172, 220, 222, 226, 240, 242, and 244 may be any devices other than summers which are suitable for generating errors.

Also, the controller 18 and the controller 208 are shown as comprising various blocks. Each of these blocks may be implemented, either individually or in the aggregate, as one or more discrete components, as one or more integrated circuits, as one or more programmable logic circuits or arrays, as software, and/or the like.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A system comprising:
    an AC to DC converter, wherein the AC to DC converter receives an input AC and converts the input AC to an output DC, wherein the input AC has a voltage, a current, and a power factor based upon the voltage and current;
    a controller, wherein the controller is arranged to receive the output DC and the voltage and current of the input AC, wherein the controller is arranged to control the AC to DC converter so that the power factor is controlled, and wherein the controller has an integrator arranged to control ripple in the output DC.

2. The system of claim 1 wherein the controller includes an error generator arranged to generate an error based upon the output DC and a DC reference, wherein the error is provided as an input to the integrator, and wherein the integrator produces an integrated error.

3. The system of claim 2 wherein the controller includes a multiplier arranged to produce a multiplication output based upon the integrated error and the voltage of the input AC.

4. The system of claim 3 wherein the controller includes a current regulator arranged to control the AC to DC converter based upon a comparison involving the multiplication output and the current of the input AC.

5. The system of claim 4 wherein the error is a first error, and wherein the current regulator includes:
    an error generator arranged to generate a second error based upon the multiplication output and the current of the input AC; and,
    a pulse width modulation block arranged to produce a converter controlling output based upon the second error and a carrier.

6. The system of claim 1 wherein the controller includes a multiplier arranged to produce a multiplication output based upon the voltage of the input AC and the output DC.

7. The system of claim 6 wherein the controller includes a current regulator arranged to control the AC to DC converter based upon a comparison involving the multiplication output and the current of the input AC.

8. The system of claim 1 wherein the controller includes a current regulator arranged to control the AC to DC converter based upon a comparison involving the current of the input AC, the voltage of the input AC, and the output DC.

9. The system of claim 1 wherein the integrator includes a low gain path for substantially steady state conditions and a high gain path for transient conditions.

10. The system of claim 9 wherein the integrator includes:
    an error generator arranged to generate an error based upon a DC reference and a feedback representative of the output DC;
    a multiplier arranged to produce a multiplication output based upon the error and a substantially absolute value of the error;
    a summer arranged to produce a sum based upon the multiplication output and the error; and,
    an integration block arranged to integrate the sum.

11. The system of claim 10 wherein the summer is a first summer, and wherein the integrator further includes a second summer arranged to produce the feedback based upon a sum of a current of the output DC and a representation of a voltage of the output DC.

12. The system of claim 9 wherein the integrator includes:
    an error generator arranged to generate an error based upon a DC reference and a feedback representative of the output DC;
    a bang-bang block responsive to the error to provide a bang-bang output;
    an integration block responsive to the error to provide an integrated error output;
    and a selector arranged to select from among the bang-bang output and the integrated output depending upon a magnitude of the error.

13. The system of claim 12 wherein the integrator further includes a summer arranged to produce the feedback based upon a sum of a current of the output DC and a signal representation of a voltage of the output DC.

14. The system of claim 12 wherein the integrator further includes an initial condition block arranged to set the integration block to a set of initial conditions based upon a representation of a current of the output DC.

15. The system of claim 9 wherein the controller includes an error generator arranged to generate an error based upon a DC reference and the output DC, wherein the error is provided as an input to the integrator, and wherein the integrator produces an integrated error.

16. The system of claim 15 wherein the controller includes a multiplier arranged to produce a multiplication output based upon the integrated error and the voltage of the input AC.

17. The system of claim 16 wherein the controller includes a current regulator arranged to control the AC to DC converter based upon a comparison involving the multiplication output and the current of the input AC.

18. The system of claim 9 wherein the controller includes a multiplier arranged to produce a multiplication output based upon the voltage of the input AC, the output DC, and a DC reference.

19. The system of claim 18 wherein the controller includes a current regulator arranged to control the AC to DC converter based upon a comparison involving the multiplication output and the current of the input AC.

20. The system of claim 9 wherein the controller includes a current regulator arranged to control the AC to DC converter based upon a comparison involving the current of the input AC, and the voltage of the input AC, and the output DC.

21. The system of claim 1 wherein the AC to DC converter receives a three-phase input AC and converts the three-phase input AC to an output DC, and wherein the controller includes:
    a coordinate transformer arranged to transform the three-phase input to a direct component and a quadrature component;

a first error generator arranged to generate a direct component error based upon the direct component and a direct component reference;

a second error generator comparator arranged to produce a quadrature component error based upon the quadrature component and a quadrature reference;

the coordinate transformer being responsive to the direct component error and the quadrature component error to produce a three-phase current reference; and, a current controller arranged to control the AC to DC converter in response to the three-phase current reference and the three-phase input AC.

22. The system of claim 21 wherein the controller further includes a selector arranged to select transformation coordinates for the coordinate transformer based upon an angle of the three-phase input AC.

23. The system of claim 21 wherein the current controller includes:

a third error generator arranged to generate error outputs in response to the three-phase current reference and the three-phase input AC;

a frequency detector arranged to detect a frequency of the three-phase input AC; and, a PWM block arranged to control the AC to DC converter in response to the error outputs and the frequency of the input AC.

24. The system of claim 21 wherein the second error generator comprises a third error generator arranged to generate a feedback error based upon the output DC and a DC reference.

25. The system of claim 24 wherein the integrator is arranged to integrate the feedback error in order to produce the quadrature reference.

26. The system of claim 25 wherein the integrator includes a low gain path for substantially steady state conditions and a high gain path for transient conditions.

27. A system comprising:

AC to DC converting means for converting an input AC to an output DC, wherein the input AC has a voltage, a current, and a power factor between the voltage and current;

controlling means for controlling the AC to DC converting means in response to the voltage and current of the input AC and in response to the output DC so that the power factor is controlled and so that ripple in the output DC is controlled.

28. The system of claim 27 wherein the controlling means includes error generating means for generating an error based upon the output DC and a DC reference, and wherein the controlling means reduces the ripple in the output DC in response to the error.

29. The system of claim 28 wherein the controlling means includes multiplying means for multiplying the error and the voltage of the input AC to produce a multiplication output.

30. The system of claim 29 wherein the error generating means is a first error generating means, wherein the error is a first error, and wherein the controlling means includes:

second error generating means for generating a second error in response to the multiplication output and the current of the input AC; and, a pulse width modulator arranged to control the AC to DC converter in response to the second error and a carrier.

31. The system of claim 27 wherein the controlling means includes multiplying means for multiplying the voltage of the input AC by a quantity based upon the output DC to produce a multiplication output.

32. The system of claim 27 wherein the controlling means is a first controlling means, wherein the first controlling means includes second controlling means for controlling ripple in the output DC, and wherein the second controlling means includes a low gain path for substantially steady state conditions and a high gain path for transient conditions.

33. The system of claim 32 wherein the second controlling means includes:

error generating means for generating an error in response to a DC reference and a feedback representative of the output DC;

multiplying means for multiplying the error and a substantially absolute value of the error in order to produce a multiplication output;

sum producing means for producing a sum based upon the multiplication output and the error; and, integrating means for integrating the sum.

34. The system of claim 33 wherein the second controlling means further includes feedback producing means for producing the feedback based upon a current of the output DC and a voltage of the output DC.

35. The system of claim 32 wherein the second controlling means includes:

error generating means for generating an error based upon a DC reference and a feedback representative of the output DC;

means responsive to the error for providing a bang-bang output;

integrating means for integrating the error in order to provide an integrated error output;

and selecting means for selecting the bang-bang output or the integrated output depending upon a magnitude of the error.

36. The system of claim 35 wherein the second controlling means further includes feedback producing means for producing the feedback based upon a current of the output DC and a voltage of the output DC.

37. The system of claim 35 wherein the second controlling means further includes an initial condition providing means for providing to the integrating means with a set of initial conditions based upon a current of the output DC.

38. The system of claim 32 wherein the second controlling means includes:

error generating means for generating an error based upon a DC reference and a feedback representative of the output DC; and, integrating means for integrating the error to produce an integrated error.

39. The system of claim 38 wherein the first controlling means includes multiplying means for multiplying the integrated error and the voltage of the input AC in order to produce a multiplication output.

40. The system of claim 32 wherein the first controlling means includes multiplying means for multiplying the voltage of the input AC and a quantity representative of the output DC and a DC reference in order to produce a multiplication output.

41. The system of claim 27 wherein the AC to DC converter receives a three-phase input AC and converts the three-phase input AC to an output DC, and wherein the controlling means includes:

coordinate transforming means for transforming the three-phase input AC to a direct component and a quadrature component;

first error generating means for generating a direct component error based upon the direct component and a direct component reference;

second error generating means for generating a quadrature component error based upon the quadrature component and a quadrature reference;

the coordinate transforming means being responsive to the direct component error and the quadrature component error to produce a three-phase current reference; and, regulating means for regulating the AC to DC converter in response to the three-phase current reference and the three-phase input AC.

42. The system of claim 41 wherein the controlling means further includes selecting means for selecting transformation coordinates for the coordinate transforming means based upon an angle of the three-phase input AC.

43. The system of claim 41 wherein the regulating means includes:

third error generating means for generating error outputs in response to the three-phase current reference and the three-phase input AC;

frequency detecting means for detecting a frequency of the input AC; and, converter controlling means for controlling the AC to DC converter in response to the error outputs and the frequency of the input AC.

44. The system of claim 41 wherein the second error generating means comprises third error generating means for generating a feedback error based upon the output DC and a DC reference.

45. The system of claim 44 wherein the second error generating means comprises quadrature reference producing means for producing the quadrature reference in response to the feedback error.

46. The system of claim 45 wherein the quadrature reference producing means includes a low gain path for substantially steady state conditions and a high gain path for transient conditions.

47. A method comprising the following steps:

a) converting an input AC to an output DC, wherein the input AC has a voltage, a current, and a power factor between the voltage and current;

b) responding to the voltage and current of the input AC so that the power factor is a substantially unity power factor; and, c) responding to the output DC so that ripple in the output DC is suppressed.

48. The method of claim 47 wherein step c) comprises the step of integrating an error based upon the output DC and a DC reference.

49. The method of claim 47 wherein step c) comprises the step of integrating an error based upon the output DC and a DC reference in a low gain path during substantially steady state conditions and in a high gain path during transient conditions.

* * * * *